United States Patent Office 3,039,145
Patented June 19, 1962

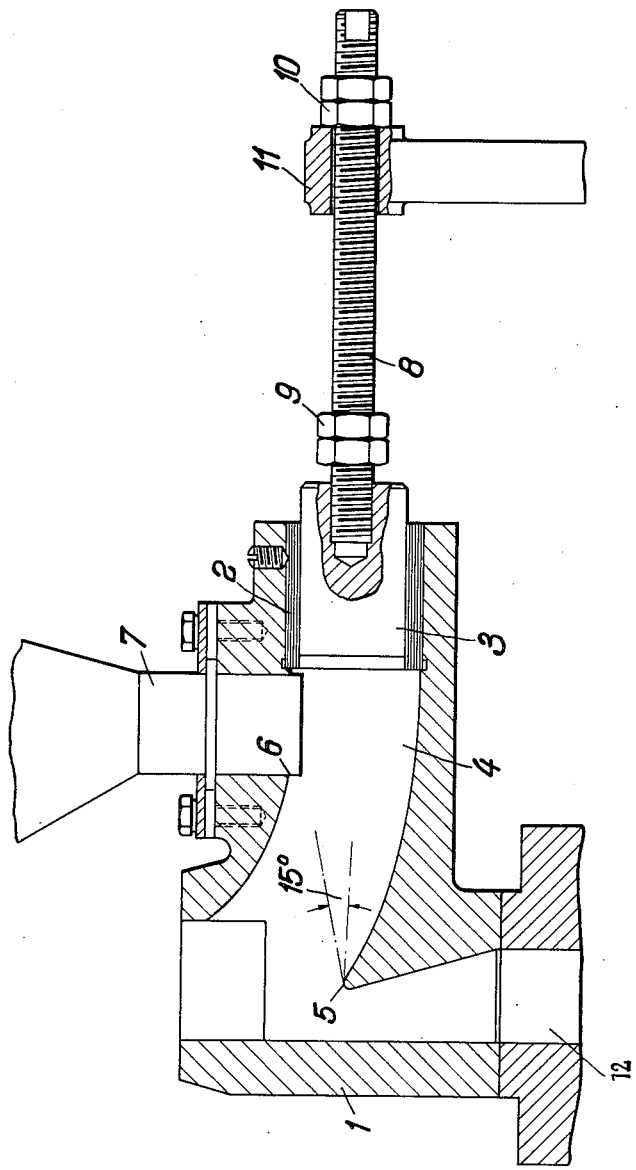

3,039,145
METERING DEVICE FOR INJECTION MOULDING MACHINES FOR THERMOPLASTIC MATERIALS
Erhard Langecker, Meinerzhagen, Westphalia, Germany, assignor to Gebruder Battenfeld Maschinenfabrik, a firm of Germany
Filed Sept. 18, 1959, Ser. No. 840,915
Claims priority, application Germany Sept. 25, 1958
4 Claims. (Cl. 18—30)

With injection moulding machines for thermoplastic materials known metering devices are used, which receive the thermoplastic material required for the individual injection processes from a supply bin and feed the material in front of the injection plungers. Various kinds of such metering devices are already known. To some extent weighing machines are used for this purpose, but it is preferred to use sliders which do not effect the metering by weight, but by volume. The present invention relates to a metering device of the latter kind.

With slider metering devices the distance between the inlet aperture in the heating cylinder and the outlet aperture of the hopper depends on the angle of slope or repose of material, which is about 15° for the hard, preferably granular, spherical material generally used with injection moulding machines for thermoplastic materials. In this connection the use of plungers having a circular cross section means a comparatively larger distance between the two said apertures, so that it is better to fit such machines with slide valves having a rectangular cross section, which are adjustably connected with the injection plunger. Now, the last-mentioned slide valves have certain drawbacks. It often happens, for instance, that the granular material is squeezed between the metering slider and the front edge of the hopper inlet aperture, causing damage to the driving member of the metering slider of the metering device and soiling the material itself. Difficulties also arise in the production of such metering devices from several components.

The present invention obviates these disadvantages and comprises a device which is free from the defects described of the types of construction used hitherto; this device operates in a satisfactory manner without any squeezing of the material and its construction is extremely simple.

According to the invention the bore for guiding the material gradually increases in cross section, and is so curved upwardly that a ramp is formed between the lower edge of the bore and the front edge of the hopper inlet aperture, the angle of which ramp or slope prevents any material rolling out of the supply bin.

The metering ram is only guided in front of the hopper inlet aperture, and the bore in which the ram guide is inserted is larger in diameter than the ram bore for example by about twice the size of the granules used.

An embodiment of the invention will now be described by way of example with reference to the accompanying drawing.

In the drawing 1 is the body or housing of the metering device, which is preferably of cast metal. In the housing 1 is inserted a short hardened liner 2, for example by pressing in, said liner serving as a guide for the ram 3. The bore of the liner 2 is smaller than the diameter of the feeding channel 4 of the housing in which the liner is inserted by about twice the size of the granules used.

The shape of the feeding channel 4 is important for the invention. As can be seen from the drawing it is curved upwardly and increases in cross section towards the edge 5. The curvature of the bore is chosen so that the line connecting the edge 5 and the front edge 6 of the inlet aperture of hopper 7 includes with the horizontal the gradient of slope, that is to say, the slope which, with the material generally employed, has an inclination of about 15°. This choice of angle prevents any material dropping from the inlet hopper being able to slide away over the edge 5 into the admission channel 12 of the heating cylinder. On the other hand the increase in cross-section of the feeding channel 4 towards the ramp edge prevents any clamping or quoining of soft plastic material.

The bottom of hopper 7 is connected to a flange which is maintained on the body 1 by conventional bolts.

In the liner 2 travels the metering ram 3, which is driven in known manner. The metering ram 3 is adjustably connected in the usual way with the injection plunger of the machine. For this purpose there is screwed onto the ram 3 a piston rod 8 on which are adjustably accommodated two stops 9 and 10, consisting for example each of two nuts. Between the stops moves a driving member 11 controlled by the injection plunger not shown in the drawing, which driving member moves the metering ram 3 in reciprocating motion via the stops 9 and 10 in the requisite manner. The metering ram 3 is preferably cylindrical. The liner 2 must therefore also have a cylindrical bore, and the feeding channel 4 may also have a circular cross-section over its whole length.

The device also has the particular advantage of security against accident, by comparison with volume metering devices in which the possibility of clamping or quoining soft plastic material is present, which is excluded in the invention furthermore by the smaller diameter of the ram by comparison with the feeding channel 4.

The ram is preferably guided only before it could pass along as it passes across the hopper inlet aperture, i.e. only by the liner 2.

What I claim is:
1. A metering device for injection-molding machines for artificial material comprising a body, a substantially horizontal feeding channel disposed in said body, an inlet aperture having a front edge disposed in said body, said inlet aperture being in communication with said feeding channel, a storage hopper for storing the artificial material mounted on said body and being in communication with said inlet aperture, a liner disposed in said feeding channel to one side of said inlet aperture, said liner having a bore less than the diameter of said feeding channel, a ram having the same diameter as the bore of said liner and being movably disposed in the bore of said liner, a plunger operatively connected to said ram to move said ram along said feeding channel to feed the artificial material therealong, said liner guiding said ram across said inlet aperture, and a substantially vertical admission channel in communication with said feeding channel to receive the artificial material fed by said ram, said feeding channel increasing in cross section while curving gradually and continuously upwardly from the front edge of said inlet aperture to said admission channel and forming an overflowing edge whereby the angle formed between the front edge of the inlet aperture and the over- flowing edge prevents any feeding of the artificial material while said ram is inoperative.

2. A metering device as claimed in claim 1, wherein the metering ram is cylindrical.

3. A metering device according to claim 1 wherein the feeding channel is twice the size of said liner.

4. A metering device according to claim 1 wherein the angle formed between the front edge of the inlet aperture and the overflowing edge is 15°.

References Cited in the file of this patent
UNITED STATES PATENTS

| | | |
|---|---|---|
| 1,506,887 | Collins | Sept. 2, 1924 |
| 1,694,381 | Hartman | Dec. 11, 1928 |
| 2,436,999 | MacMillin et al. | Mar. 2, 1948 |
| 2,484,777 | Ziska | Oct. 11, 1949 |
| 2,736,923 | Schieser et al. | Mar. 6, 1956 |
| 2,737,686 | Harkenrider | Mar. 13, 1956 |